United States Patent
Yogey

[11] Patent Number: 5,894,838
[45] Date of Patent: Apr. 20, 1999

[54] WINDOW FOR A CENTRAL SOLAR RECEIVER WITH VOLUMETRIC ABSORBER

[75] Inventor: Amnon Yogey, Rehovot, Israel

[73] Assignee: Yeda Research and Development Company Ltd., Rehovot, Israel

[21] Appl. No.: 08/817,365

[22] PCT Filed: Oct. 20, 1995

[86] PCT No.: PCT/US95/13629

§ 371 Date: Sep. 25, 1997

§ 102(e) Date: Sep. 25, 1997

[87] PCT Pub. No.: WO96/12918

PCT Pub. Date: May 2, 1996

[30] Foreign Application Priority Data

Oct. 23, 1994 [IL] Israel ..................... 111368

[51] Int. Cl.[6] ..................................... F24J 2/02
[52] U.S. Cl. ..................... 126/680; 126/698; 126/700
[58] Field of Search ........................... 126/680, 681, 126/683, 699, 700, 701

[56] References Cited

U.S. PATENT DOCUMENTS 4,043,315  8/1977  Cooper .......................... 126/686
4,211,212  7/1980  Braun ............................ 126/685

*Primary Examiner*—James C. Yeung
*Attorney, Agent, or Firm*—Sprung Kramer Schaefer & Briscoe

[57] ABSTRACT

A transparent windows (4) for a solar radiation receiver assembly and a solar receiver assembly using the same, which assembly comprising a housing (2) having an aperture (3) and holding a volumetric solar absorber (5), the transparent window (4) mounted in the aperture (3) for the admission of incident concentrated solar radiation, shielding the volumetric solar absorber so as to form a sealed absorber chamber capable of holding a fluid medium, and means for the ingress and egress of the fluid medium. The transparent window (4) consists of a plurality of discrete transparent window segments (11,12) set in a common matrix (10) and is capable of withstanding high temperature.

17 Claims, 2 Drawing Sheets

WINDOW FOR A CENTRAL SOLAR RECEIVER WITH VOLUMETRIC ABSORBER

FIELD OF THE INVENTION

The invention relates to a central solar radiation receiver that is associated with an optical concentration system.

BACKGROUND OF THE INVENTION

A central solar radiation receiver admits concentrated light at extremely high temperatures, commonly about 700°–1500° C., so that a solar absorber mounted therein, preferably a volumetric solar absorber, absorbs the incident concentrated light, converts it into heat and the so-generated heat is transferred to a heat carrier fluid, or is used to perform a thermochemical process.

Volumetric solar receivers generally have a tubular housing accommodating a volumetric solar absorber shielded by transparent window so as to form a sealed absorber chamber capable of holding a working fluid or a chemical reaction mixture in direct contact with the absorber. In operation, the working fluid or reaction mixture is caused to flow across the absorber chamber whereby heat is withdrawn from the absorber and is either utilized for the chemical reaction or is transported outside the receiver. Typical solar receivers with volumetric absorber are disclosed, for example, in U.S. Pat. No. 5,245,986 and U.S. Pat. No. 5,323,764.

The transparent window that shields the volumetric solar absorber in a solar receiver must be capable of sustaining the extreme conditions of high solar flux, high temperature and pressures associated with the conditions of operation. In recent patents such as U.S. Pat. No. 5,323,764, it was shown that conical windows that are placed inside the receiver to shield the absorber and form the sealed absorber chamber so that the axis of propagation of the solar light is along the axis of the conical window, perform extremely well under severe conditions of heat and pressure. Since the concentrated solar light is approaching the window at a wide angular distribution, it penetrates the window whenever it intersects therewith. The design of the window can be such that a small amount of light which is reflected in a single interaction between the light and the window will eventually penetrate the window after successive interactions.

For a solar receiver designed for use in large scale solar energy systems, large size transparent windows that meet the above requirements are required. However, windows with the necessary large dimensions and having the required optical qualities are not readily available. For example, the diameter of commercially available quartz or fused silica circular pieces does not exceed 40 cm, and pieces with larger dimensions have to be made to order.

It is accordingly the object of the present invention to provide an improved solar receiver window for a central solar receiver which can be made from commercially available elements.

SUMMARY OF THE INVENTION

In accordance with the invention there is provided a solar radiation receiver assembly comprising a housing having an aperture and holding a volumetric solar absorber, a transparent window capable of withstanding high temperature mounted in said aperture for the admission of incident concentrated solar radiation, shielding the volumetric solar absorber so as to form a sealed absorber chamber capable of holding a fluid medium, and means for the ingress and egress of said fluid medium, characterized in that the window consists of a plurality of discrete transparent window segments set in a common matrix capable of withstanding high temperature.

There is further provided, in accordance with the present invention, a window for a solar radiation receiver assembly, capable of withstanding high temperature and adapted for admission of incident concentrated solar radiation, characterized in that the window consists of a plurality of discrete transparent window segments set in a common matrix capable of withstanding high temperature.

The matrix that holds the window segments may be a suitably shaped prefabricated body with apertures for receiving and holding the window fragments. Alternatively, the matrix may be made ad hoc from a ready-made frame in which the window segments are mounted with the aid of suitably shaped connecting members.

If desired, the window segments may have different dimensions, e.g. for the purpose of maximizing the window segment holding capacity of a circular matrix and, as a result, the transparency of the window. The window segments may also have different shapes such as flat, cylindrical, globular and conical.

The fluid medium inside the absorber chamber may be liquid or gaseous and may be a heat carrier or a chemical reaction mixture.

BRIEF DESCRIPTION OF THE DRAWINGS

For better understanding the invention will now be described, by way of example only, with reference to the annexed drawings in which.

DESCRIPTION OF THE PREFERRED EMBODIMENTS

Figure 1:
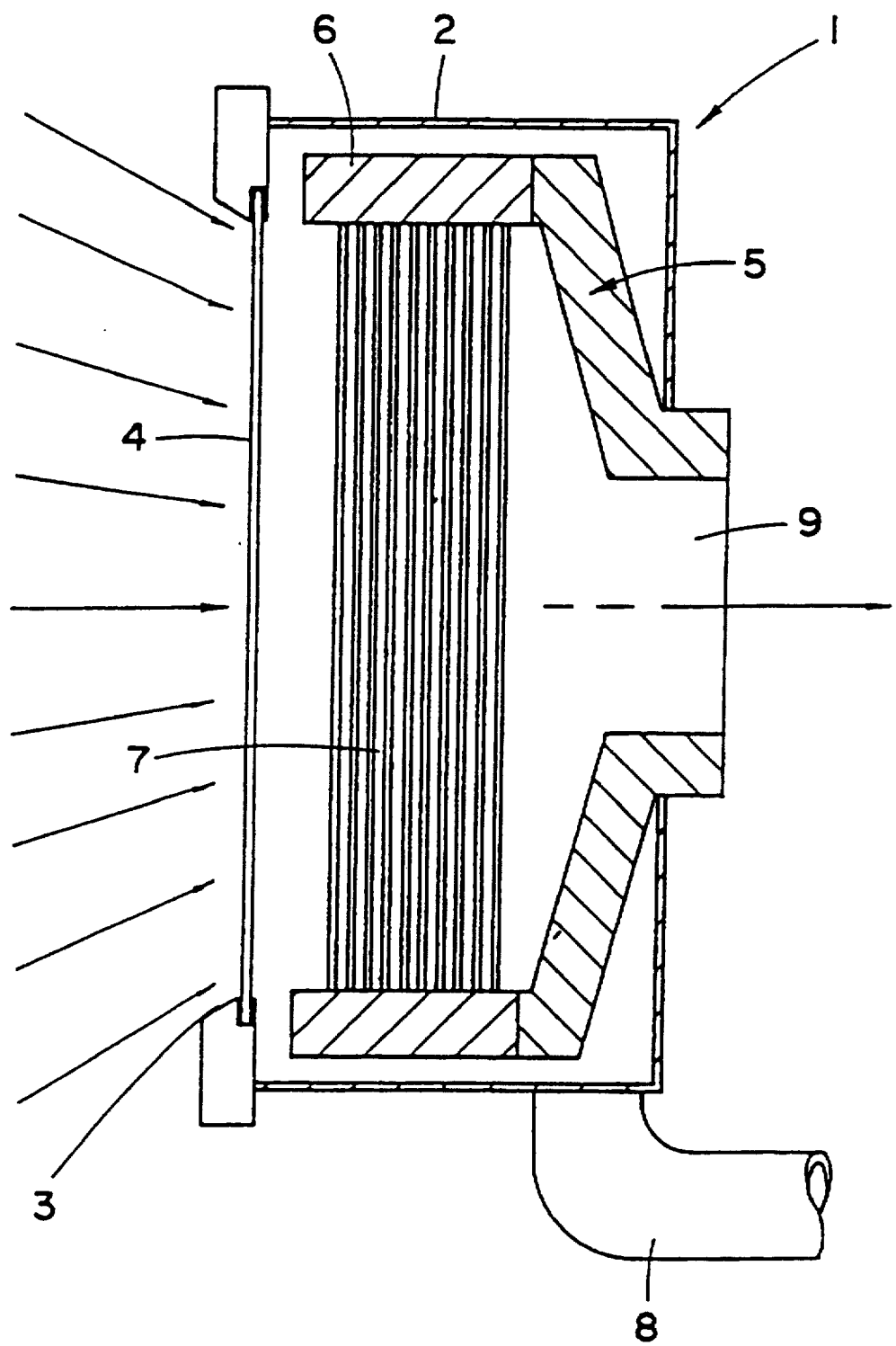
FIG. 1 is a schematic illustration of a solar radiation receiving assembly according to the invention.

FIG. 1 shows a central solar receiver with a volumetric absorber of the kind shown in FIG. 1 of U.S. Pat. No. 5,245,986. As shown, the solar receiver 1 comprises a solar receiver housing 2 having an aperture 3 holding a transparent window 4 for the admission of incident concentrated solar radiation of the kind shown in FIG. 2 herein. Housing 2 accommodates a solar absorber 5 having a frame 6 secured to the housing, and a plurality of absorber elements 7 held in frame 6. The housing comprises an intake pipe 8 serving for the ingress of a working fluid surrounding the absorber 5 and an opening 9 for the egress of heated-up working fluid.

Figure 2:
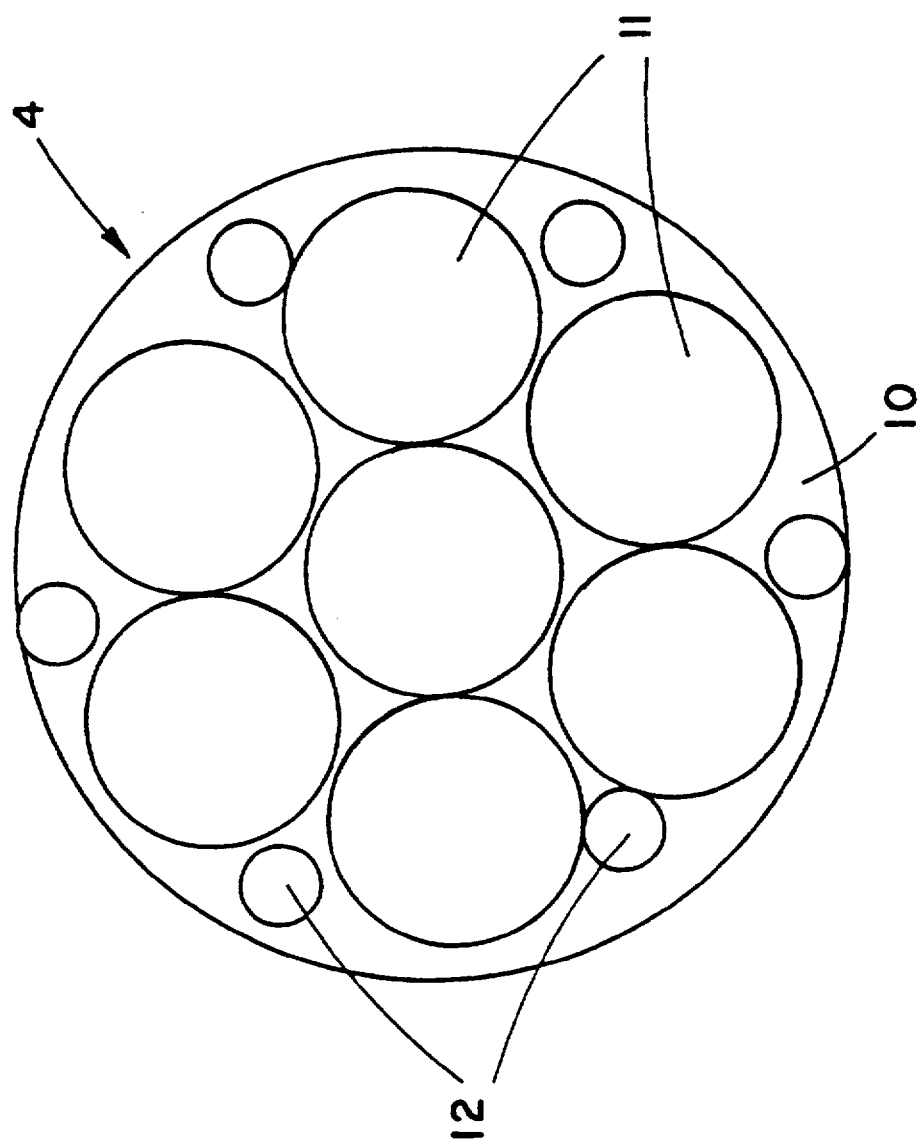
FIG. 2 is a schematic front view of a window used in the solar radiation receiver assembly according to the present invention.

FIG. 2 is a schematic illustration of the window 4 made in accordance with the present invention. The window 4 comprises a matrix 10 made of a high temperature resistant material holding a plurality of large diameter window segments 11 and small diameter window segments 12, all made of quartz glass. Due to the different sizes of window segments 11 and 12, the transparency of window 4 is maximized so that about 80% of the aperture 3 admits concentrated solar radiation.

The window according to the invention may also be used with other configurations of central solar receivers with volumetric solar absorbers, for example, of the kind shown in FIG. 1 of U.S. Pat. No. 5,323,764 and described in description thereof, which FIG. 1 and description are incorporated herein by reference. As shown in FIG. 1 of U.S. Pat.

No. 5,323,764, the solar receiver comprises an aperture and a frusto conical window with cylindrical rim portions and designed to withstand high pressure and temperature, shielding the solar absorber so as to form a sealed absorber chamber. In accordance with the invention the frusto conical window is replaced by a circular window of the kind of window 4 in FIG. 1 herein, to be mounted in aperture.

I claim:

1. A large scale solar radiation receiver assembly comprising a housing having an aperture and holding a volumetric solar absorber, a transparent window capable of withstanding high temperature and mounted in said aperture for the admission and transmission of incident concentrated solar radiation having a wide angular distribution, shielding the volumetric solar absorber so as to form a sealed absorber chamber capable of holding a fluid medium, and means for the ingress and egress of said fluid medium, characterized in that the window consists of a plurality of discrete transparent window segments set in a common matrix capable of withstanding high temperature.

2. A solar radiation receiver assembly according to claim 1, wherein the window segments have different dimensions.

3. A solar radiation receiver assembly according to claim 1, wherein the window segments are of different shapes.

4. A solar radiation receiver according to claim 3, wherein the window segments are selected from the group of flat, cylindrical, globular and conical bodies.

5. A solar radiation receiver assembly according to claim 1, wherein the matrix is a prefabricated body with apertures for receiving the window segments.

6. A solar radiation receiver assembly according to claim 1, wherein the matrix is made ad hoc from a ready-made frame in which the window segments are mounted by means of connecting members.

7. A window for a solar radiation receiver assembly, capable of withstanding high temperature and adapted for admission of incident concentrated solar radiation, characterized in that the window consists of a plurality of discrete transparent window segments set in a common matrix capable of withstanding high temperature.

8. A window according to claim 7, wherein the window segments have different dimensions.

9. A window according to claim 7, wherein the window segments are of different shapes.

10. A window according to claim 9, wherein the window segments are selected from the group of flat, cylindrical, globular and conical bodies.

11. A window according to claim 7, wherein the matrix is a prefabricated body with apertures for receiving the window segments.

12. A window according to claim 7, wherein the matrix is made ad hoc from a ready-made frame in which the window segments are mounted by means of connecting members.

13. A solar radiation receiver according to claim 1, wherein the window is of the kind that does not substantially change the direction of propagation of incident radiation.

14. A large scale solar radiation receiver assembly comprising a housing having an aperture and holding a volumetric solar absorber, a transparent window capable of withstanding high temperature and mounted in said aperture for the admission and transmission of incident concentrated solar radiation having a wide angular distribution, shielding the volumetric solar absorber so as to form a sealed absorber chamber capable of holding a fluid medium, and means for the ingress and egress of said fluid medium, said window consisting of a plurality of discrete transparent window segments having different dimensions and being set in a common matrix capable of withstanding high temperature.

15. A large scale solar radiation receiver assembly comprising a housing having an aperture and holding a volumetric solar absorber, a transparent window capable of withstanding high temperature and mounted in said aperture for the admission and transmission of incident concentrated solar radiation having a wide angular distribution, shielding the volumetric solar absorber so as to form a sealed absorber chamber capable of holding a fluid medium, and means for the ingress and egress of said fluid medium, said window consisting of a plurality of discrete transparent window segments having conical bodies and being set in a common matrix capable of withstanding high temperature.

16. A window for a large scale solar radiation receiver assembly, capable of withstanding high temperature and adapted for admission and transmission of incident concentrated solar radiation having a wide angular distribution, the window consisting of a plurality of discrete transparent window segments having different dimensions and set in a common matrix capable of withstanding high temperature.

17. A window for a large scale solar radiation receiver assembly, capable of withstanding high temperature and adapted for admission and transmission of incident concentrated solar radiation having a wide angular distribution, the window consisting of a plurality of discrete transparent window segments having conical bodies and set in a common matrix capable of withstanding high temperature.

* * * * *

UNITED STATES PATENT AND TRADEMARK OFFICE
CERTIFICATE OF CORRECTION

PATENT NO : 5,894,838
DATED : April 20, 1999
INVENTOR(S): Amnon Yogev

It is certified that error appears in the above-identified patent and that said Letters Patent is hereby corrected as shown below:

Title Page: "Inventor:"    cancel "Amnon Yogey" and substitute
Item [75]    --Amnon Yogev--

Title Page: "References Cited"    Please insert the following references:
Item [56]

U.S. Patent Documents 3,493,291, 2/3/70, Webb
5,245,986, 9/21/93, Kami
5,323,764, 6/28/94, Kami, et al.
5,010,873, 4/30/91, Hoyle Foreign Patent Documents 56 162,353, 12/14/81, Japan Signed and Sealed this Eighteenth Day of April, 2000

*Attest:*

Q. TODD DICKINSON

*Attesting Officer*     *Director of Patents and Trademarks*